May 14, 1935.  E. C. ALT  2,001,647

STEERING MECHANISM

Filed June 29, 1934   2 Sheets-Sheet 1

WITNESSES
Edw. Thorpe
Chris Feinle

INVENTOR
Eugene C. Alt
BY
Munn, Anderson & Liddy.
ATTORNEYS

May 14, 1935.  E. C. ALT  2,001,647
STEERING MECHANISM
Filed June 29, 1934  2 Sheets-Sheet 2
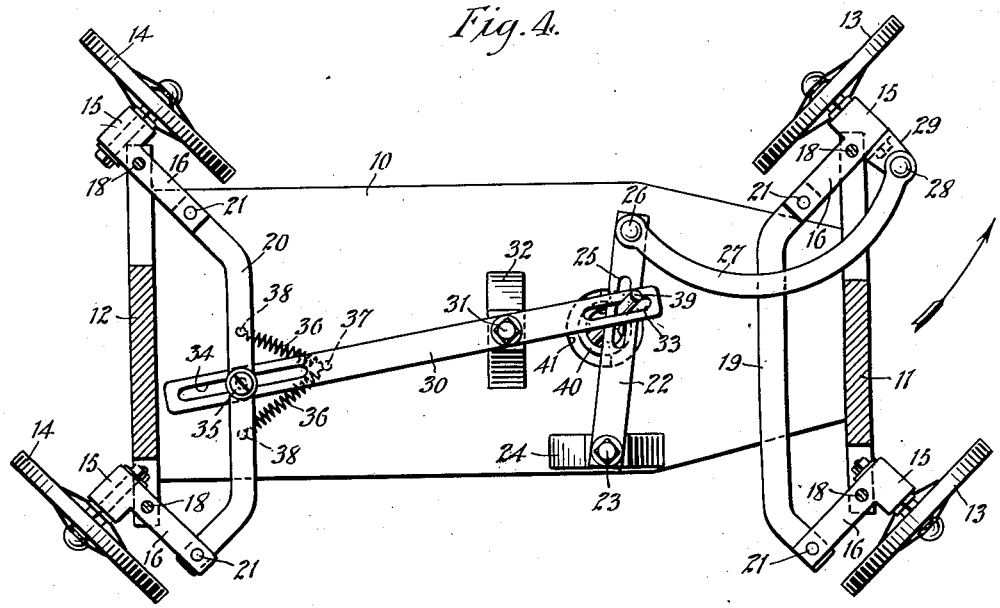
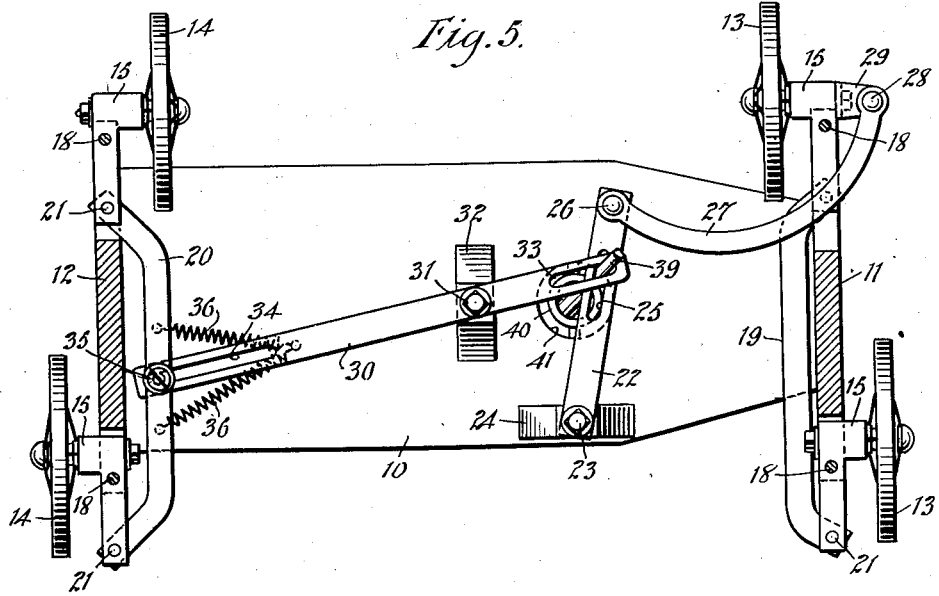
WITNESSES
Edw. Thorpe
Chris Feinle
INVENTOR
Eugene C. Alt
BY
Munn, Anderson & Liddy
ATTORNEY Patented May 14, 1935

2,001,647

UNITED STATES PATENT OFFICE 2,001,647

STEERING MECHANISM

Eugene C. Alt, Brooklyn, N. Y.

Application June 29, 1934, Serial No. 733,139

9 Claims. (Cl. 280—91)

This invention relates to a steering mechanism for vehicles of that character whereby a vehicle may be steered to travel straightaway; to turn left and right in the usual manner and/or in very short left and right circles or turns; to travel obliquely left or right; and to travel directly sidewise or laterally, either left or right, at a right angle with respect to the longitudinal axis of the vehicle.

The invention is advantageously applicable to vehicles having front and rear traction and steering wheels, or, in other words, vehicles having four wheels which may be moved simultaneously in different directions, so that a vehicle may be made to travel in the directions and manner aforesaid.

The principal object of the invention is the provision in steering mechanism of the indicated character, of improved wheel steering gear which will be simple, efficient and readily operable to cause a vehicle to follow the mentioned various paths of travel.

The nature of the invention and its distinguishing features and advantages will appear when the following specification is read in connection with the accompanying drawings, in which Figure 1 is a top view of a vehicle embodying the steering mechanism of the invention;

Fig. 4 is a view similar to Fig. 3, but showing the wheels disposed to cause the vehicle to travel in a circle;

Fig. 5 is a view similar to Fig. 3, but showing the wheels disposed to cause the vehicle to travel sidewise at a right angle with respect to its longitudinal axis.

Figure 1:
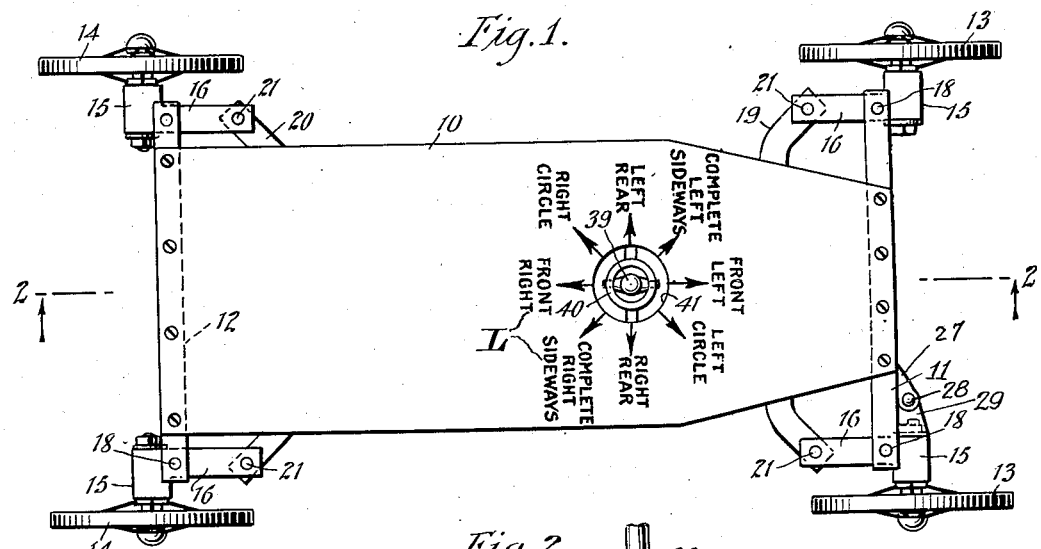
Figure 2:
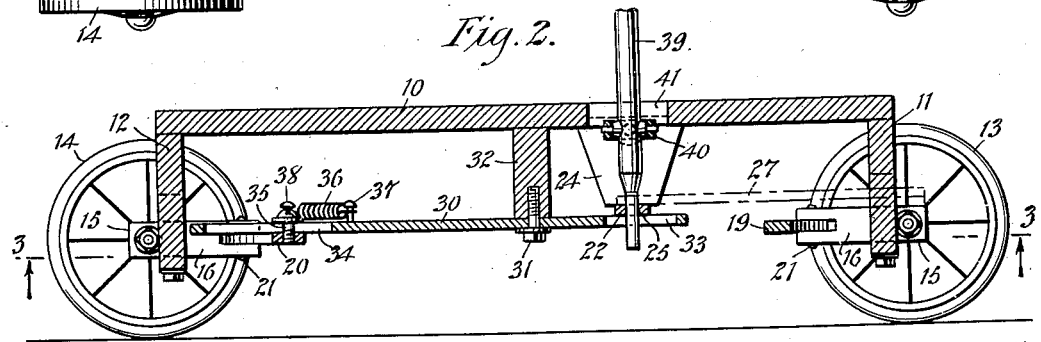
Fig. 2 is a longitudinal section on the line 2—2 of Fig. 1.
Figure 3:
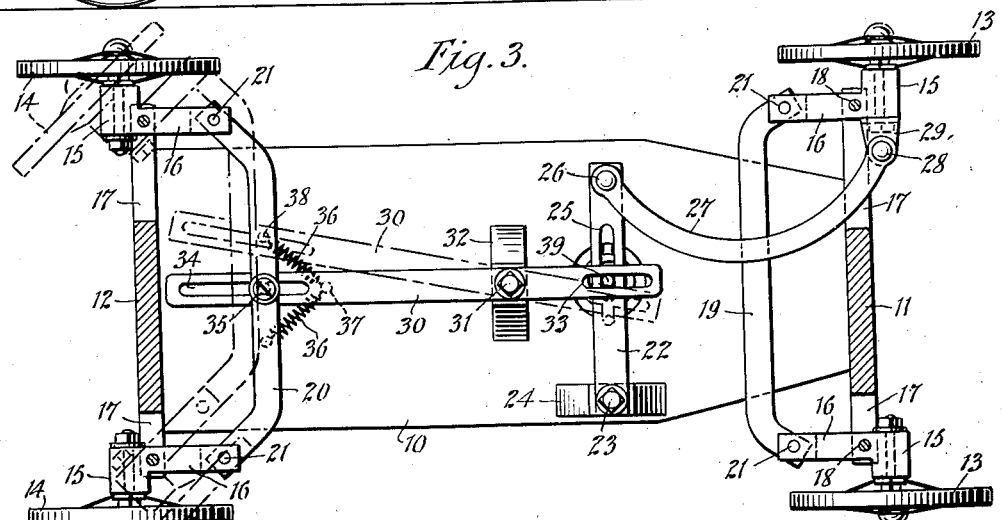
Fig. 3 is a section on the line 3—3 of Fig. 2, looking in the direction indicated by the arrows.

It is to be understood that the steering mechanism of the present invention is applicable to various types of vehicles, and in the present instance, by way of example, is shown applied to a youngster's scooter. The vehicle as illustrated in the drawings, consists of a platform or deck 10 mounted on front and rear bolsters 11 and 12 respectively. The vehicle also includes the front and rear traction and steering wheels 13 and 14 respectively. Each of the wheels has a knuckle 15 and each knuckle 15 has an arm 16. There are two front wheels 13 which are connected with the front bolster 11, and the two rear wheels 14 which are connected with the rear bolster 12. Each bolster 11 and 12 is cut out or bifurcated as at 17 to receive the knuckles 15 of the wheels, and a bolt 18 passes vertically through the bolster and each knuckle 15, to thus connect the wheels 13 and 14 with the bolster 11 and 12 respectively for pivotal movement on a vertical axis. The arms 16 on the knuckles 15 of the front wheels 13 are connected by a connecting rod 19, and the arms 16 of the rear wheel knuckles 15 are connected by a connecting rod 20. The ends of each of the rods 19 and 20 is pivotally connected as at 21 with the arms 16 respectively. The wheels 13 are thus connected to move in unison, and the wheels 14 are similarly connected. The parts hereinbefore described constitute the vehicle or running gear.

In accordance with the invention, there is provided steering gear whereby the wheels 13 and 14 may be moved to guide the vehicle to travel straightaway; to turn left and right in the usual manner, and/or in very short left and right circles or turns; to travel obliquely left or right; and to travel directly sidewise or laterally, either left or right, at a right angle with respect to the longitudinal axis of the vehicle. The said steering gear includes a lever 22, whose fulcrum 23 is on one end thereof and fixed to a block 24 on the underside of the platform 10 at one side thereof. The lever 22 has a longitudinal slot 25 therein between its ends. The end of the lever 22 opposite its fulcrumed end is pivotally connected as at 26 with one end of a curved link 27 whose opposite end is pivotally connected as at 28 with a lug 29 on the knuckle 15 of the right front wheel 13. A second lever 30 is employed whose fulcrum 31 is disposed between its ends, the fulcrum being fixed to a block 32 on the underside of the platform 10 near the middle thereof. The lever 30 has a longitudinal slot 33 in its front end and a somewhat longer longitudinal slot 34 in its rear end. A pivot pin 35 is fixed to the connecting rod 20 and extends into the slot 34 to thus provide a pin and slot connection between the lever 30 and the connecting rod 20 and thereby permit pivoting and sliding movement between these parts. Retractile springs 36 are employed to aid in returning the parts to a normal relationship in which the wheels 13 and 14 will be disposed parallel to the longitudinal axis of the vehicle. Each spring 36 has one end connected with the lever 30 as at 37 and its other end is connected as at 38 with the connecting rod 20. Manually operable means is employed to operate the levers 22 and 30. The said means includes a control element or "stick" 39 which is mounted for universal movement by a gimbal 40 or equivalent means carried by the platform 10, the latter having an opening 41 therein to accommodate the control element 39, whoses upper end is disposesd above the platform and whose lower end is disposed below the platform. The lower end of the control element 39 extends through the slots 25 and 33 respectively in the levers 22 and 30, to operate the levers 22 and 30 in response to the operation of the control element 39, it being possible for a youngster to grasp the upper end of the element 39 to operate it while riding on the platform 10.

The steering gear hereinbefore described is such that by moving the control element or "stick" 39 directly forward, the front wheels 13 only will be turned to the left, through the intervention of the lever 22, link 27, knuckles 15 and connecting rod 19. In this manner the vehicle may be caused to travel or turn to the left. By moving the element 39 directly rearward, the front wheels 13 will be moved simultaneously to the right, through the intervention of the aforesaid parts and thereby causing the vehicle to travel or turn to the right. By moving the control element 39 laterally to the left or at right angles to the longitudinal axis of the vehicle, the rear wheels 14 will be moved on their pivots 18 to the left, through the intervention of the lever 30, connecting rod 20, knuckles 15, thereby causing the rear end of the vehicle to swing to the left as it is moving in a forward direction, to make a rear end turn. By moving the control element 39 directly laterally to the right, a right rear end turn may be made, through the intervention of the lever 30, connecting rod 20 and knuckles 15 of the rear wheels 14. By moving the control element 39 forward and to the left, the front wheels 13 and also the rear wheels 14 will be moved to the left, by reason of the operation of both levers 22 and 30 and connected parts, thereby causing the vehicle to move obliquely to the left. By moving the control element 39 rearwardly and to the right, the vehicle may be caused to move or travel obliquely to the right, since the front wheels 13 and the rear wheels 14 will be disposed to the right and all of the parts of the steering gear will operate as will be understood.

By moving the control element 39 forwardly and to the left, the front wheels 13 will be turned to the left, and the rear wheels 14 will be turned to the right, by reason of the operation of all of the movable parts of the steering gear, thereby causing the vehicle to travel in a circle of relatively short radius to the left, and by moving the control element 39 rearwardly and to the right, the vehicle may be caused to travel in a circle of a short radius to the right, since the front wheels 13 will be turned to the left, as shown in Figure 4. By moving the control element 39 hard rearwardly to the left to the limit, all of the wheels will be moved or turned to positions at right angles to the longitudinal axis of the vehicle, thereby making it possible for the vehicle to travel directly sidewise or laterally, either to the left or right, as shown in Figure 5.

In order to instruct the user in the operation of the control element 39 to cause the vehicle to follow the desired paths of travel, legends L are inscribed, printed or otherwise applied to the upper surface of the platform in proximity to the opening 41.

It is to be understood that the invention is not restricted to the precise arrangement of parts shown and described, as details of construction may be modified and rearranged without departing from the spirit of the invention, the scope of which is limited only by the terms of the appended claims.

I claim:
1. In steering mechanism for a vehicle, the combination with front and rear traction and steering wheels of the vehicle, of steering gear connected with said wheels, said gear including slotted lever means, a manually operable control element, and means mounting said element for universal movement, the lower end of said element being slidably engaged in the slots in said lever means.

2. In steering mechanism for a vehicle, the combination with front and rear traction and steering wheels of the vehicle, of steering gear connected with said wheels, said gear including a slotted lever whose fulcrum is on one end, a second slotted lever whose fulcrum is between its ends, a manually operable control element, and means mounting said element for universal movement, the lower end of said element being slidably engaged in the slots in said levers.

3. In steering mechanism for a vehicle, the combination with front and rear traction and steering wheels, knuckles for the wheels respectively, and rods, one rod connecting the knuckles of the front wheels and the other rod connecting the knuckles of the rear wheels, of slotted lever means, a link connecting the lever means and one of the front wheel knuckles, a pivot slide connection between the lever means and the rod connecting the rear wheel knuckles, a manually operable control element, and means mounting said element for universal movement, the lower end of said element being slidably engaged in slots in said lever means.

4. In steering mechanism, steering gear including a connecting rod, slotted lever means, a pivot and slide connection between said rod and lever means, a manually operable control element, and means mounting said element for universal movement, the lower end of said element being slidably engaged in slots in said lever means.

5. In steering mechanism, steering gear including a connecting rod, slotted lever means, a pivot and slide connection between said rod and lever means, a retractile spring having one end connected with said rod and the opposite end connected with said lever means, a manually operable control element, and means mounting said element for universal movement, said element being slidably engaged in slots in said lever means.

6. In steering mechanism, steering gear including a connecting rod, a lever whose fulcrum is on one end, a second lever whose fulcrum is between its ends, a pivot and slide connection between the second lever and said rod, a manually operable control element, and means mounting said element for universal movement, the lower end of said element being slidably engaged in slots respectively in said levers.

7. In steering mechanism, steering gear including a connecting rod, a lever whose fulcrum is on one end and having a straight slot therein, a second lever whose fulcrum is between its ends, a pivot and slide connection between one end of the second lever and said rod, the other end of the second lever having a straight slot therein, a manually operable control element, and means mounting said element for universal movement, the lower end of said element being slidably engaged in the straight slots in said levers.

8. In steering mechanism, steering gear including a connecting rod, slotted lever means, a pivot slide connection between said rod and lever means, a manually operable control element, means mounting said element for universal movement, the lower end of said element being slidably engaged in slots in said lever means, a traction wheel knuckle, and a link connecting the lever means and the knuckle.

9. In steering mechanism, steering gear including a connecting rod, a lever whose fulcrum is on one end and having a straight slot therein, a second lever whose fulcrum is between its ends, a pivot slide connection between one end of the second lever and said rod, the other end of the second lever having a straight slot therein, a manually operable control element, means mounting said element for universal movement, the lower end of said element being slidably engaged in the straight slots in said levers, a traction wheel knuckle, and a link having one end pivotally connected with the slotted end of the first lever and the opposite end pivotally connected with said knuckle.

EUGENE C. ALT.